Figure 1:
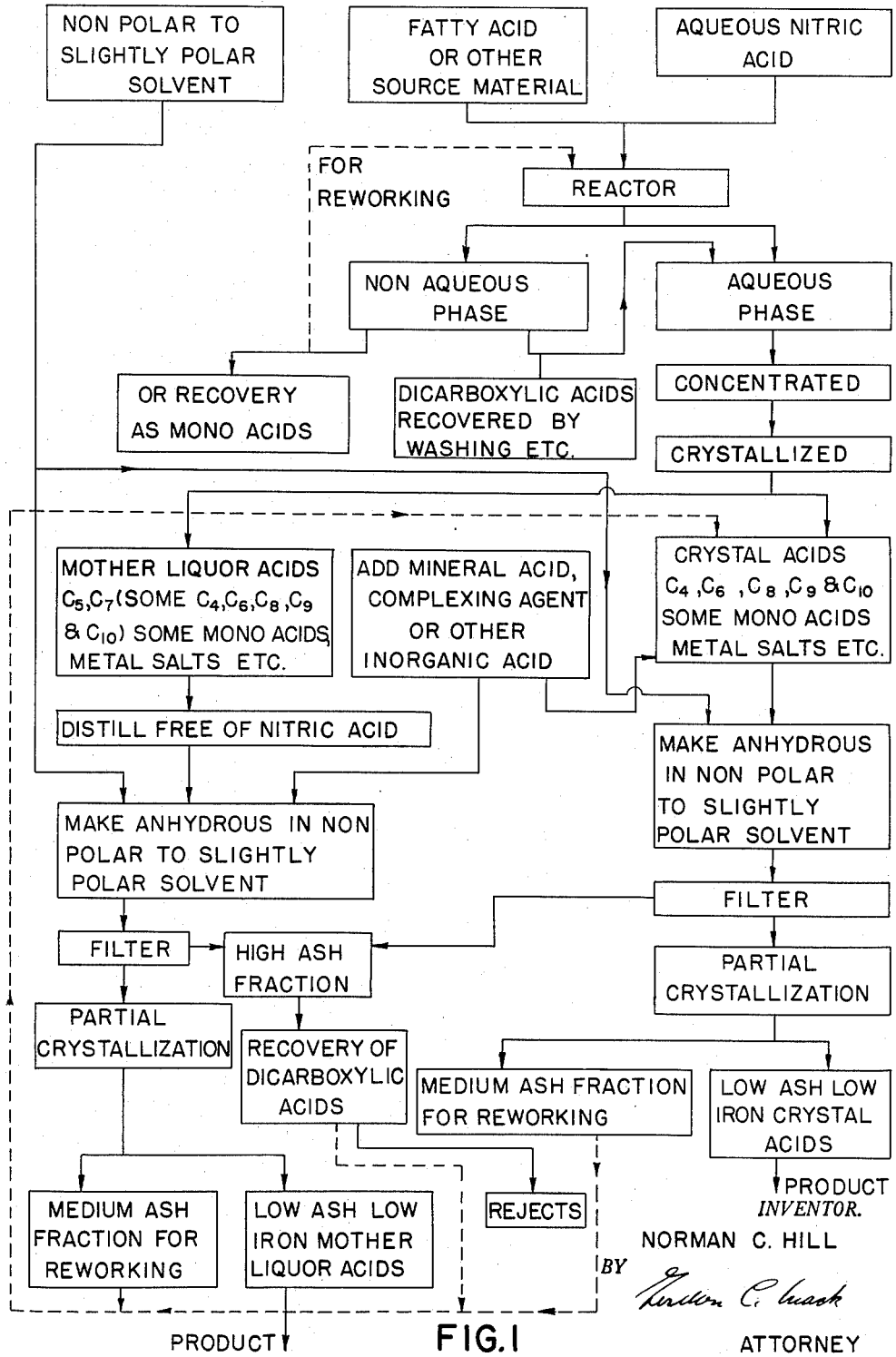

United States Patent Office 2,971,023
Patented Feb. 7, 1961

2,971,023
REMOVAL OF METALS FROM DICARBOXYLIC ACIDS

Norman C. Hill, Akron, Ohio, assignor to The C. P. Hall Company, Akron, Ohio, a corporation of Ohio Filed May 24, 1955, Ser. No. 510,667

8 Claims. (Cl. 260—485)

This invention relates to the removal of metal salts from dicarboxylic (alpha, omega-alkanedioic) acids, and particularly from such acids obtained by the oxidation of source materials of the class which consists of the saturated and unsaturated cyclic and acyclic hydrocarbons and oxygen-containing derivatives thereof which hydrocarbons and derivatives contain 4 carbon atoms linked with single bonds in a straight chain.

The term "salts" as used herein includes in addition to the salts of inorganic acids salts of the carboxylic (including nitrogen-containing carboxylic) acids.

The metal salts are objectionable in the dicarboxylic acids when used in various ways. For example, in the manufacture of nylon, polyurethane and other high polymers, the presence of metal ions (or metal salts) in the polymerization affects the rate of the polymerization. Since such metal salts act as catalysts, they must be reduced to a minimum. In fact, the specifications of the dicarboxylic acids employed for such polymerizations state that the iron shall not exceed 3 p.p.m. and that ash shall not exceed 0.05% (500 p.p.m.).

The removal of metal ions or salts, therefore, from dicarboxylic acids, assumes a place of importance in the manufacture of these acids far beyond the usual problem of purification.

The metal salts are derived from three principal sources. First, they may be present in the source material. For instance, a principal source material is the fatty acid from an animal or vegetable oil such as oleic acid, etc. The principal metal salts in such source materials are sodium and iron salts of the fatty acids. If the source material is an Oxo process residue the metal salts may be those produced by contact of the reactants with the vessels, pipes, pumps, etc. If the Oxo process residue is a distillate, it may be free or nearly free of metal salts. The second source of metal salts is the catalysts employed either in the formation of the crude material or in the oxidation itself. These may be organic or inorganic salts. The third source is the metal salts produced by action of components of the reaction mixture on the reactor in which the oxidation is carried out, and the pipes, pumps, etc., used in the process. These may be iron, chromium or nickel salts of mono- or dicarboxylic acids. If nitric acid is used in the oxidation, nitrates will ordinarily be formed. On the other hand, if sulfuric acid is used, as in a chromic acid oxidation, sulfates will be produced. If, on the other hand, the oxidizing agent is potassium permanganate, iron, chromium or nickel manganates or sulfates will be formed, if sulfuric acid has been used. Although ordinarily the impurities derived from the reaction vessels, etc. will be iron, chromium and nickel salts, other metal salts may be formed, depending upon the composition of the reaction vessel, etc.

All such metal salts or inorganic salts derived therefrom are almost insoluble in anhydrous non-polar to slightly polar solvents, while dicarboxylic acids are soluble in these solvents, especially at temperatures of 80 to 125° C. Therefore, according to the invention, the dicarboxylic acids containing metal salts are dissolved in such solvents and by making the solutions anhydrous, the salts are precipitated or are not dissolved.

There are several ways of treating the solution in which the metal salts have been precipitated. These metal salts may be filtered off or the solution containing the metal salts may have alcohol added to it to form an ester. If an ester is formed, the alcohol may be added before the dehydration is complete, or the dehydration may be completed before adding the alcohol. Likewise, the precipitated salts may be to some extent removed from the solution before completing the esterification. On completion of the esterification, the esters may be separated by distillation, preferably by fractional distillation.

The metal salts may be water-soluble—and, if so, they become insoluble upon making the solution anhydrous. If water is permitted to remain in the dicarboxylic acid-organic solvent solution, it is thus possible that some metals may remain dissolved therein. An important feature of the invention is, therefore, to make the batch anhydrous while in solution in the non-polar to slightly polar solvent while another feature is the addition of inorganic (more particularly mineral) acids in amounts sufficient to react with the metals present to further reduce the metal impurities. The impurities may thus be readily separated from such solutions of the dicarboxylic acids, and the dicarboxylic acids may then be recovered from the solutions in any desired manner as by cooling to cause crystallization or by distillation of the solvent and subsequent crystallization, etc.

Not only does the addition of inorganic acid improve the separation of metals from the associated dicarboxylic acids, but it has been found that the partial crystallization of dicarboxylic acids acts in a manner to give co-precipitation of the metals with the first fraction of the dicarboxylic acids, thus reducing the metals in the remaining fraction materially. This is shown in Examples III, VI and VII.

The source materials include, for example, animal and vegetable fatty acids, and a monoethenoidic fatty acid such as oleic acid is preferred. Fatty acids low in rosin acids from tall oil, acidulated foots from cottonseed oil and soyabean oil, etc., form particularly desirable source materials. Other fatty acids that may be used include those from linseed oil, castor oil, cocoanut oil, lard oil, peanut oil, sunflowerseed oil, rapeseed oil, mustardseed oil, safflower oil, red oil, fish oil, fishliver oil, etc. Although fatty acids from such latter sources react chemically as indicated, they are usually too expensive to be used in this process. Cheaper fatty acids will ordinarily be employed even though they have a high content of linoleic acid. The glyceride and glycerine content should be low. Other source materials for the oxidation are petroleum hydrocarbons. Synthetic source materials may also be used, such as saturated and unsaturated cyclic and acyclic hydrocarbons and oxygenated derivatives thereof, including hydroxy and keto compounds (e.g., 9,10-octodecandiol) and cyclic hydroxy and keto compounds; such suitable synthetic source materials may include mixtures of such compounds constituting Oxo process residues and Fischer-Tropsch process oxygenated chemical residues.

Various oxidizing agents may be employed depending upon the starting material used. Thus, permanganates, chromic acid, ozone, air, oxygen, nitrous acid, and oxides of nitrogen greater than $N_2O$ are known as oxidizing agents for the oxidation of unsaturated fatty acids such as oleic acid, etc. to dicarboxylic acids and monocarboxylic acids. The same is true for the unsaturated hydrocarbons, except that when air is used as the oxidizing agent a high temperature and catalyst must be employed. If the starting material is an aldehyde, a ketone, or a hydroxy compound, such as is produced by the Oxo process or Fischer-Tropsch process, pretty much any of these oxidizing agents may be used. On the other hand, if the starting material is a saturated fatty acid or a saturated hydrocarbon, nitric acid is the only oxidizing agent which it is feasible to use under known oxidizing conditions. The predominant reaction with other oxidizing agents appears to be the formation of hydroxy compounds and peroxides with scission. Various catalysts have been employed, and this invention contemplates their use. In various of the reactions as, for example, in the oxidation of an unsaturated fatty acid, the various oxidizing agents will split the molecule at the double bond and produce one molecule of dicarboxylic acid and one molecule of monocarboxylic acid. Oxides of nitrogen such as $NO_2$, $N_2O_4$ and other oxides above $N_2O$ may be used, which in aqueous solution and in the presence of oxygen produce some nitric acid. Nitric acid and these oxides of nitrogen and also hydrogen peroxide and ozone form desirable oxidizing agents because they leave no inorganic residue. The inorganic nitrogen-containing compounds present after oxidation may be easily separated by volatilization.

The entire reaction product or any desired portion thereof may be treated with anhydrous non-polar to slightly polar solvent to effect the separation of the metal salts from the dicarboxylic acids. If nitric acid is present in the oxidation product the non-polar to slightly polar solvent selected must be one to which the nitric acid is inert, unless the nitric acid is first removed. Similarly, the solvent must be inert to other components present in the oxidization product or the portion thereof treated with the solvent.

The non-polar to slightly polar solvents which can be used include:

(a) Chlorinated aromatic compounds such as monochlorobenzene, ortho-dichlorobenzene or metadichlorobenzene, etc.

(b) Chlorinated aliphatic compounds such as 1,2,3-trichloropropane and other chlorinated aliphatic hydrocarbons.

(c) Ethers, preferably dibutyl ether and higher; dichloroisopropyl ether and the like have proved satisfactory.

(d) Hydrocarbons (aliphatic including normal and branched chain), such as nonane, decane up to dodecane or higher (see remarks on boiling points).

(e) Aromatic hydrocarbons may be used but they are generally not as satisfactory as the aliphatic hydrocarbons or the halogenated hydrocarbons (see remarks on boiling points).

(f) Alcohols may be used except for the tendency to esterify. Tertiary amyl alcohol is almost free of this tendency and is satisfactory except for cost.

The boiling point of the solvent is important in that if its boiling point is not high enough at atmospheric pressure the batch must be held under pressure so that temperatures of 135 to 140° C. may be reached, if necessary, to throw the batch into solution. Such low boilers as benzene, toluene, ethyl and propyl ether while useful are dangerous, because of the possibility of leaks and subsequent vaporization, static or other sparks and ignition. It is therefore preferred, though not absolutely necessary, to use solvents having boiling points of 150 to 220° C. Too high boiling points cause difficulty in removing the last traces of the solvent from the dicarboxylic acids, hence many solvents will work satisfactorily except for removing them readily at the end of the purification.

Often the oxidation is carried out with an aqueous oxidizing agent, in which case the oxidation product is a two-phase product. The aqueous phase contains the more soluble dicarboxylic acids together with monocarboxylic acids. If nitric acid is employed in the oxidation, nitrogen derivatives are produced which will herein be referred to as "nitrocarboxylic acid." They are nitromonocarboxylic acids to a considerable extent, but some nitrodicarboxylic acids, etc., may be present. This nitrocarboxylic acid is somewhat soluble in non-polar to slightly polar solvents which fact permits the method of purification described in co-pending application of Hill and Higuchi Serial No. 510,768 filed May 24, 1955, now abandoned.

Figure 2:
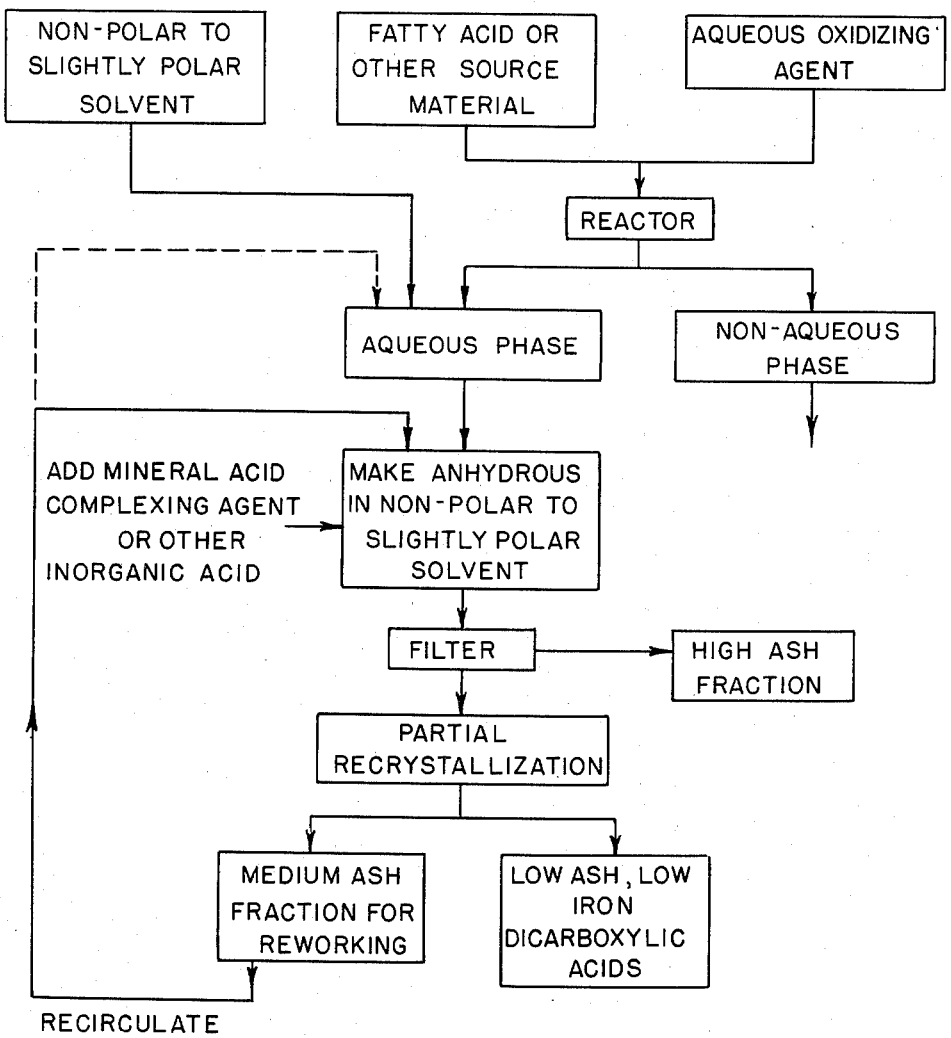

The non-aqueous phase, also, contains monocarboxylic acids and it contains a considerable portion of the less water-soluble dicarboxylic acids. Thus, if red oil (largely oleic acid) or another fatty acid derived from an animal or vegetable oil is oxidized with aqueous nitric acid, the dicarboxylic acids produced contain all of the homologues from succinic acid ($C_4$) to sebacic acid ($C_{10}$). Glutaric acid ($C_5$) and pimelic acid ($C_7$) are quite soluble in the aqueous phase of the oxidation product. This phase will also include a considerable portion of succinic acid ($C_4$) and adipic acid ($C_6$) and small proportions of the higher homologues ($C_8$ to $C_{10}$ dicarboxylic acids). This portion of the product is frequently referred to hereinafter as mother liquor acids. Most of the higher dicarboxylic acid homologs ($C_8$ to $C_{10}$ acids) will be found in the non-aqueous phase together with large quantities of monocarboxylic acids. Thus it is desirable to effect a preliminary separation of dicarboxylic acids, etc., by separating the aqueous and non-aqueous phases of the reaction product and recovery of some or all of the dicarboxylic acids from the non-aqueous phase and adding the recovered dicarboxylic acids to the aqueous phase before treating with the non-polar or slightly polar solvent. It is better to separate any nitric acid from the dicarboxylic acids also before removing the metals therefrom. It is preferable, though not necessary, to separate the dicarboxylic acids into the two types—mother liquor acids and crystal acids—before applying the metal-separating treatment. The crystal acids are that group of acids coming out as crystals composed largely of the following: $C_4$ (succinic), $C_6$ (adipic), $C_8$ (suberic), $C_9$ (azelaic) and $C_{10}$ (sebacic). One method for following this general procedure, using nitric acid as the oxidizing agent, is illustrated in Figure 1. On the other hand, the entire dicarboxylic reaction product may be treated with the non-polar or slightly polar solvent to dissolve all or nearly all of the dicarboxylic acids; and then by removal of the water, precipitate the metal salts by making the solution anhydrous and recover the dicarboxylic acids from the solution. This is illustrated in Figure 2. Lower metal content dicarboxylic acids can be produced by crystallizing a portion of said acids in order to co-precipitate said metal salts.

Figure 3:
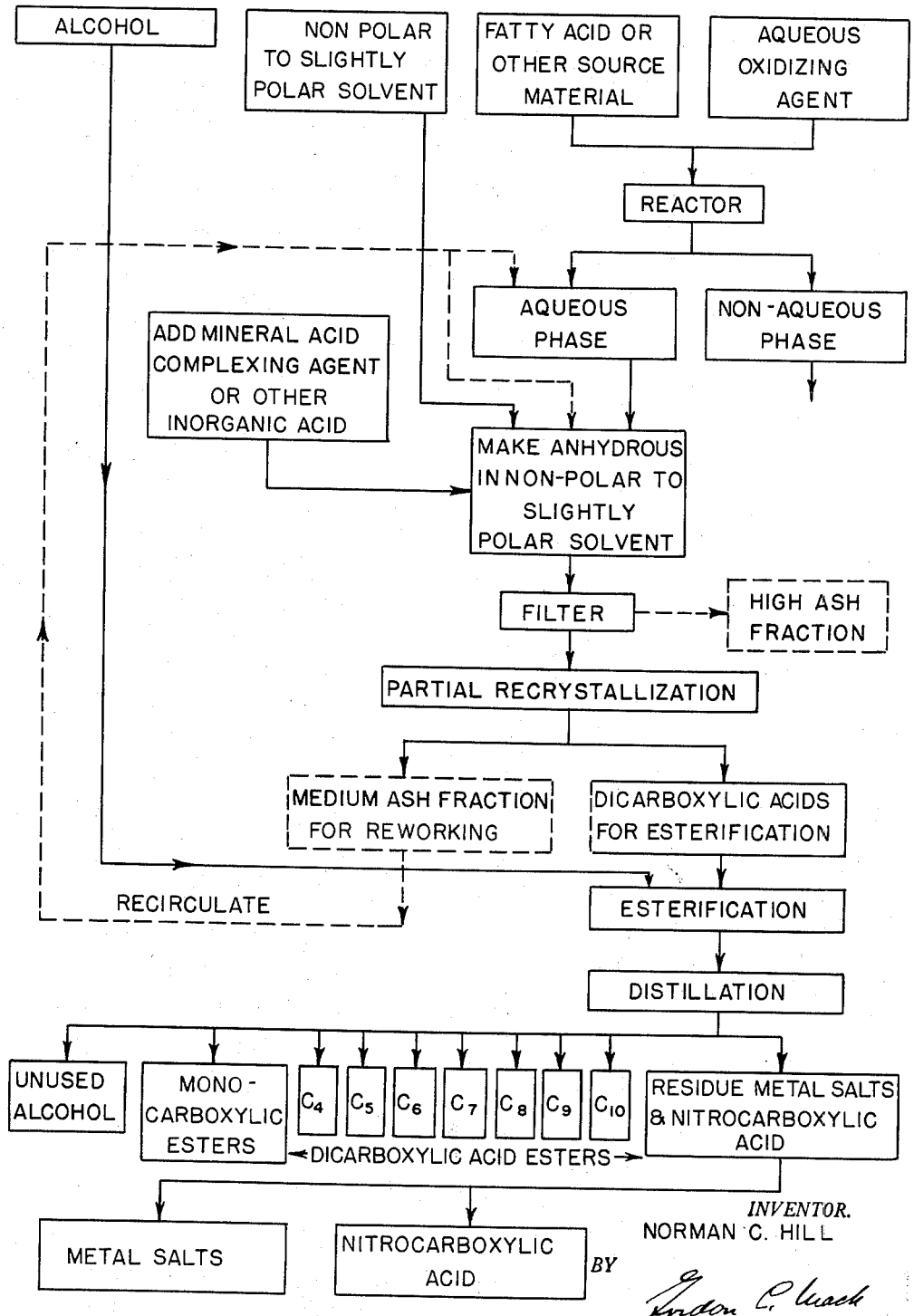

Whether or not the dicarboxylic acids are separated into the mother liquor acids and the crystal acids, the solution of the acids, with or without removal of the metal salts, may be converted to their esters, as for example, is illustrated in Figure 3. Figure 3 shows in dotted lines the removal of the precipitated metal salts before esterification, showing that this procedure is an alternative of the procedure also shown in dotted lines showing the metal salts present in the residue from the distillation.

The invention, as illustrated in Figure 1, will be more particularly described in connection with the production of dicarboxylic acids from a mixture of the fatty acids from acidulated cottonseed and soyabean foots and from tall oil fatty acids low in rosin acids. The oxidizing agent was 25 percent nitric acid. The total dicarboxylic acids produced and the relative proportions of each are shown in Table 1 where they are reported on an acid-free, metal-free, and nitric acid-free basis.

TABLE 1

| Carbon No. | Acid | From Acidulated Cottonseed-Soyabean Foots Fatty Acids | From Tall Oil Fatty Acids |
| --- | --- | --- | --- |
| 4 | Succinic | 11.65 | 6.26 |
| 5 | Glutaric | 12.50 | 7.20 |
| 6 | Adipic | 14.55 | 10.43 |
| 7 | Pimelic | 16.00 | 5.11 |
| 8 | Suberic | 25.87 | 35.66 |
| 9 | Azelaic | 16.83 | 31.07 |
| 10 | Sebacic | 2.50 | 4.28 |
|  |  | 99.90 | 100.01 |

Both reaction products contained two phases, namely, an aqueous phase and a non-aqueous phase. Most of the metal-derivative impurities were dissolved into the aqueous phase. We are therefore principally concerned with the recovery of dicarboxylic acids from the aqueous phase of such reaction products, and from dicarboxylic acids derived from the nonaqueous phase by any convenient means, as by extraction of the non-aqueous phase using water or nitric acid as described by the copending application of Hill and Higuchi Serial No. 510,769 filed May 24, 1955, now Patent No. 2,841,601 or by actual solution of the monocarboxylic acid by a non-polar solvent and the subsequent crystallization thereby of the dicarboxylic acids contained therein as covered by co-pending application of Hill and Higuchi Serial No. 510,769 filed May 24, 1955, now Patent No. 2,841,601. Ordinarily, the solution of the aqueous phase or the dicarboxylic acids secured therefrom, in the nonpolar or slightly polar solvent will be made anhydrous by boiling to remove all water present. If the non-polar solvent has a low boiling point, other methods of water-removal may be resorted to, as, for example, treatment with an anhydrous inert salt, such as sodium sulfate, etc.

The entire aqueous phase may be treated with the nonpolar or slightly polar solvent and then by rendering this solution anhydrous, as by boiling the water away, the metal salts will separate out. By using the previously described solvent most of the moisture in the crystal acids may be readily separated and the solution in the nonpolar or slightly polar solvent will be rendered anhydrous by the separation of the phases. Where the entire production is to be rendered anhydrous or where the mother liquor acids above are involved, this is best accomplished by distilling off the balance of the water, preferably at subatmospheric pressures. The temperature, of course, is largely dependent upon the solvent used and the type of dicarboxylic acids to be dehydrated (mother liquor or crystal acids).

Ordinarily, it will be desirable to take advantage of the relative solubilities of the various dicarboxylic acids in the aqueous phase by fractionally crystallizing them therefrom and then separately treating the crystal fractions with non-polar to slightly polar solvent and then rendering the solution anhydrous to bring the dicarboxylic acids into solution, thus precipitating the metal salts, and then separating the precipitated salts therefrom.

The process can be operated in many different ways:

(a) Using all of the product as produced by the plant substantially as shown in Table 1, and as illustrated in Figure 2.

(b) Treatment of crystal acids as a whole or any part thereof, substantially as shown in Figure 1.

(c) Treatment of the mother liquor acids as a whole or any part thereof, substantially as shown in Figure 1.

Although all of the above are possible ways of treatment, the process is preferably, but not necessarily, handled as outlined below:

The $C_5$ and $C_7$ dicarboxylic acids together with associated acids, generally called mother liquor acids, are preferably removed from the crystal acids by concentrating the whole dicarboxylic acid product to say 50 or 60 percent solids, cooling and thus producing and separating the crystal acids. Most of the metal contamination will be found in the mother liquor acids where ash may run as high as 9900 p.p.m. (0.99%) or higher on the dry basis. The crystal acids may be found to contain 0.07% to 0.20% ash on the dry basis, depending on the number of crystallizations the crystal acids have had, the source material used and the methods of formation and washing of the crystals. In each case the ash may be reduced to 0.01 to 0.02 percent by following the invention described herein. Thus on the average this process will remove 60% to 85% of the ash originally found in the crystal acids and about 98% of that in the mother liquor acids.

The crystal acids may be separated from the mother liquor acids by crystallizing from water, nitric acid or any other convenient polar solvent. This may be done prior to the metals' separation; preferably, although not necessarily so. If water (or nitric acid) is used the first acid to be crystallized out will be the fraction high in $C_8$, $C_9$ and $C_{10}$. The next will be that high in $C_6$ and the batch high in $C_4$ will come out as the solution is cooled or concentrated and cooled. Usually the whole of the crystal acids $C_4$, $C_6$, $C_8$, $C_9$ and $C_{10}$ are handled as a single batch and the metals are removed therefrom at one time.

In order that the metal salts are present as inorganic salts it is preferable, although not necessary, to add sulfuric or phosphoric acid (or other mineral acid) to the batch and thus convert the metal salt from that of an organic acid to an inorganic salt. The inorganic salts are less soluble in the presence of the organic acid than are organic salts of the metals in the presence of the same organic acids. The addition of the sulfuric, phosphoric or other mineral acid results in decreased metal salts in the finished product.

If toluene or other solvent reactive with nitric acid is employed, it will usually be desirable to remove all the nitric acid from the aqueous solution before adding the solvent. On subsequent removal of all of the water the metal salts become an insoluble sludge and can be removed by filtration. The dicarboxylic acids may be crystallized from the resulting solution.

EXAMPLE I

*Reduction of ash in crystal acids*

In one run composed largely of the higher dicarboxylic acids ($C_8$ to $C_{10}$) these acids were crystallized from the aqueous phase of the oxidation product produced by the aqueous nitric acid oxidation of a mixture of the fatty acids from acidulated cottonseed-soyabean foots. (The analysis of the total dicarboxylic acids present in the oxidation product is given in Table 1.) The crystal acids contained 0.07 percent (700 p.p.m.), on the dry basis, containing mostly iron and sodium with some heavy metals as, for instance, chromium, nickel, lead, manganese, copper and tin. By preparing a solution of the crystal acids in orthodichlorobenzene, boiling to dehydrate and precipitate the metal salts and then separating these by filtration and then crystallizing out the dicarboxylic acids, dicarboxylic acids with an ash content of 0.01 to 0.02 percent (100 to 200 p.p.m. ash) were obtained. Thus in this example the ash was reduced at least 0.05% or at least 71.4% reduction.

The mother liquor from which the higher dicarboxylic acids have been crystallized contained most of the metal salts. The analysis of these mother liquor acids on the dry solids basis was found to be 9900 p.p.m. (0.99%). A sample of this material was ashed and the ash so secured was submitted to spectrographic analysis. The spectrographic analysis is given in Table 2.

TABLE 2

*Spectrographic analysis of ash from M. L. acids before treatment*

(1) Ash content of M.L. acids—dry solids basis—0.99%, 9900 p.p.m.

The following percentages apply against the foregoing ash content:

(2) Percent base metals—

| | Percent |
|---|---|
| Sodium | [1] 40.9— |
| Iron | 24.41— |

(3) Percent major metals—

| | |
|---|---|
| Chromium | 1.35 |
| Nickel | [1] 2.00 |
| Cobalt | [1] 2.00 |
| Lead | [1] 2.00 |

(4) Percent minor metals—

| | |
|---|---|
| Calcium | <0.2 |
| Tungsten | <0.2 |
| Manganese | <0.2 |
| Tin | <0.2 |
| Copper | <0.2 |

(5) Traces—

| | |
|---|---|
| Zinc | <0.01 |
| Aluminum | <0.01 |
| Magnesium | <0.01 |
| Silicon | <0.01 |
| Silver | <0.01 |

[1] Estimated.

It has been found that the dicarboxylic acids shown here, called mother liquor acids can be reduced tremendously in metal content by the treatment of the water solution of these acids with cationic resins, preferably both cationic, anionic, and then cationic resins, in this order or by mixed bed treatment. Such treatment with cationic resins is covered in co-pending application Hill and Kuceski, Serial No. 450,822 filed August 18, 1954, now Patent No. 2,858,335. In such treatment the metal content of the acids is reduced from the values shown in Table #2 to those shown in Table #3.

TABLE 3

*Spectrographic analysis of ash from mother liquor acids after treatment with resins*

(1) Ash content of M.L. acids—dry solids basis—426 p.p.m.

The following spectrographic values are based upon the foregoing ash content:

| | Percent |
|---|---|
| (2) Percent base metals—Sodium | [1] 50–70 |

(3) Percent major metals—None (4) Percent minor metals—

| | |
|---|---|
| Chromium | 0.15 |
| Iron | <0.20 |
| Calcium | <0.20 |
| Silicon | <0.20 |
| Copper | <0.20 |

(5) Traces—

| | |
|---|---|
| Nickel | <0.01 |
| Cobalt | <0.01 |
| Lead | <0.01 |
| Aluminum | <0.01 |
| Tin | <0.01 |
| Magnesium | <0.01 |

[1] Estimated.

The objection to such treatment is the removal of such large amounts of metals and the resulting frequent regenerations. Such regenerations require labor (man hours), chemicals and loss in yield connected therewith. It is, therefore, best to reduce the metal content as much as possible by the most convenient and the cheapest process and then follow by the resin process which gives the lowest obtainable values, where such extreme purification is desired. The resin equipment, therefore, operates for a longer time, at lower cost, and gives a generally better product.

This same plan of treatment applies to treating the crystal acids first by the method described herein, followed by a resin treatment either immediately thereafter or at the very end of the process, before final crystallization and drying. Such treatment also applies to the mixed dicarboxylic acids, as produced (see Table 1) or in any mixture thereof.

To separate the metal salts the non-polar or slightly polar solvent is added to the aqueous solution. This is boiled at perhaps 110 to 150° C. to distill off all the water. This temperature will, of course, depend upon the solvent used and the composition of the dicarboxylic acids being treated; subatmospheric pressures are preferred. A little sulfuric or phosphoric acid is usually added to convert the metals present to sulfates or phosphates as previously described. The resulting anhydrous solution of the dicarboxylic acids in the non-polar or slightly polar solvent is filtered to remove the metal salts, as is shown on Figure 1. The dicarboxylic acids are then recovered from the solution in any suitable manner. It was found that their ash content was reduced to 0.014% to 0.04% ash, all of which is a considerable improvement on the impurities in the mother liquor acids.

The treatment of the crystal acids $C_4$, $C_6$, $C_8$, $C_9$, or $C_{10}$ is more easily accomplished than where the $C_5$ and $C_7$ acids are concerned, together with the other water-soluble dicarboxylic acids and their metal impurities. Example I shows the method of handling the crystal acids; six other examples, especially applied to mother liquor acids obtained from the oxidation of fatty acids from acidulated cottonseed-soyabean foots using aqueous nitric acid as the oxidizing agent are given showing the principles involved.

EXAMPLE II

*Reduction of ash and metals in mother liquor acids*

101.2 parts of mother liquor acids (dry basis) were taken as a 50% water solution, to which were added 404.8 parts of toluene and 1% of $H_2SO_4$ on the dry weight basis (1.012 parts $H_2SO_4$). The batch was heated to distill off the water. This amount of toluene failed to dissolve all of the dicarboxylic acids. After boiling for four hours the batch was filtered at 90° C., 40% of the acids were present as crystals and 60% as filtrate. A sample of the filtrate was taken, dried, weighed and ashed. It contained 200 p.p.m. ash or 0.02%.

EXAMPLE III

*Reduction of ash and metals in mother liquor acids*

The foregoing test run was duplicated except 303.6 parts of orthodichlorobenzene was added and after dehydration the salts collected on the filter paper weighed 3.5 parts. The resultant filtrate showed the presence of 403 p.p.m. ash and 54 p.p.m. of iron. The filtrate was cooled so as to cause the precipitation of about 20.8% by weight of the solids, which precipitated acids analyzed 1400 p.p.m. of ash and 224 p.p.m. iron (mostly succinic and adipic acid which crystallized out) while the remaining filtrate, 77.2% of the first filtrate, gave dicarboxylic acids which were 144 p.p.m. ash and 10 p.p.m. iron or a reduction in ash of 85.8% and a reduction in iron of 91.7%.

EXAMPLE IV

*Reduction of ash and metals in mother liquor acids*

50 parts of mother liquor acids were taken and 150 parts of orthodichlorobenzene; the mixture was made anhydrous and filtered at 90 to 100° C. and about 3.0 parts of precipitated material was removed. The filtrate analyzed 4900 p.p.m. ash and 400 p.p.m. iron. No mineral acid was added. Partial crystallization was not employed.

EXAMPLE V

*Reduction of ash and metals in mother liquor acids*

The foregoing test was re-run and the filtrate was cooled so as to precipitate 25% of the solids. The crystallized acids ran 3080 p.p.m. ash and 672 p.p.m. iron, while the filtrate therefrom gave acids which analyzed 2000 p.p.m. ash and 5.6 p.p.m. iron. No mineral acid was added.

EXAMPLE VI

*Reduction of ash and metals in mother liquor acids*

Duplicate test runs were made taking 50 parts of mother liquor acids (on the dry basis) and 150 parts of orthodichlorobenzene, together with 2% (1 part) of $H_2SO_4$. The filtrates gave 890 and 856 p.p.m. ash and 17 and 19.6 p.p.m. iron, respectively. The respective filtrates were crystallized out to the extent of 20 and 23 percent, giving 3000 and 3050 p.p.m. ash and 30 and 45 p.p.m. iron while the filtrates therefrom gave 200 and 200 p.p.m. ash and 10 and 12 p.p.m. iron, respectively.

EXAMPLE VII

*Reduction of ash and metals in mother liquor acids*

The foregoing test run was duplicated using 2% (1.0 part) of phosphoric acid instead of sulfuric acid and 26% of acids were permitted to crystallize out to carry down additional ash and iron. The preliminary tests showed 1484 p.p.m. ash and 4.24 parts iron while after crystallizing 26% of the acids present, these crystals showed 4600 p.p.m. ash and 8 p.p.m. iron while the remaining filtrate produced acids with 400 p.p.m. ash and 2 to 3.0 p.p.m. iron.

These examples show that phosphoric acid is more effective as a remover of iron than is sulfuric acid, yet the ash is not so low with phosphoric acid as with sulfuric acid, being mostly sodium. The examples also indicate that added mineral acid gives lower ash contents even where co-precipitation of acid crystals occurs. The effect of co-precipitation of acid crystals is quite marked in every case and for low ash and low metals, co-precipitation should be practiced.

The 20 to 25 percent of acid co-precipitated to give low ash and low metal values can be recirculated and thus purified in the next batch of dicarboxylic acids to be processed. It should also be remembered that the crystal acids are more easily purified than are the mother liquor acids so the reworking of up to 25% of crystal acids running up to 3080 or 4600 p.p.m. ash and containing 45 or 8 p.p.m. of iron is not a difficult problem. The resultant ash in the final purified dicarboxylic acids of this process are largely sodium, probably sodium oxide, sodium sulfate, sodium phosphate, or other sodium salt, for the spectrographic analyses on Tables 2 and 3 show sodium to be the most predominant substance among the metal impurities.

While this invention includes all of the inorganic acids, as possible additives, yet there are preferred acids such as sulfuric and phosphoric acids. Nitric may be added but nitric acid continues to react with organic substances during the treatment of the dicarboxylic acids and to be reduced to NO and $NO_2$ gases thus permitting the metal which may have been present as nitrates to become an organic salt or a half salt of a dicarboxylic acid. This acid, therefore, does not give as good results as sulfuric or phosphoric acid.

Hydrochloric acid may be used but should any of the chloride finds its way back into the alloy system, if nitric acid is being used as the oxidizing agent, aqua regia may be formed with resulting high corrosion damage.

Similar objections apply to most other inorganic acids since they are toxic or explosive (as are the perchloric acids and other peracids) in the presence of organic materials. Other acids which are not preferred are hydrofluoric or hydrocyanic because they are volatile or toxic or both. Acids which may be included are hydrofluorsilicic acid, fluoboric and silicic acid both separately and with sulfuric or phosphoric acids, since they form insoluble metal complexes including those with sodium, etc., which permits the reduction of sodium or the other alkali or alkali-earth metals present in the ash.

The amount of acid to be added should always be enough acid to react with the impurities as for instance 1.843 parts of $H_2SO_4$, are required for each part of $Fe_2O_3$ or 2.64 $H_2SO_4$ for each part calculated as Fe. Likewise, 1.582 parts of $H_2SO_4$ are required for each part $Na_2O$ or 2.137 parts $H_2SO_4$ are required for each part of sodium; 1.672 parts of $H_2SO_4$ are required for each part of Ni and 2.83 parts $H_2SO_4$ are required for each part of chromium. Usually, with either sulfuric or phosphoric acid 2% of the weight of dicarboxylic acid to be treated has been in excess of the amount required stoichiometrically. Silicic acid or other compounds to complex the sodium may be added—so as to further reduce the ash content—but the main point in this invention is the making of the batch anhydrous in the presence of a non-polar to slightly polar solvent, preferably with the crystallization of some of the dicarboxylic acids in solution, or with excess, undissolved dicarboxylic acids in suspension, to cause seeding or co-precipitation of the metal salts.

Figure 2 illustrates the separation of metal salts from dicarboxylic acids produced by oxidation of the source materials referred to herein without first separating the aqueous phase of the oxidation product into mother liquor acids and crystal acids. The dicarboxylic acids may, for example, be those produced from tall oil fatty acid oxidation such as illustrated in Table 1.

The oxidation product is separated into two phases. Then a non-polar to slightly polar solvent such as dichlorobenzene or other such solvent suggested herein is added to the aqueous phase and the mixture is heated to vaporize all of the water. It is preferable to first add a mineral acid or other complexing agent, as discussed more particularly in connection with the process described in connection with Figure 1 in order to effect a more complete separation of the metal combined with the carboxylic acids. The resulting product from which the salts are precipitated is filtered and the filtrate is relatively free from the metal salts. Further purification may be obtained by fractional crystallization as indicated in Figure 2, and more particularly described in connection with Figure 1.

Figure 3 illustrates the esterification of the carboxylic acids and primarily the dicarboxylic acids. The nature of the carboxylic acids in the oxidation product and thus the nature of the carboxylic acids present in the aqueous phase, depends upon the source material, the oxidizing agent, the intensity of the oxidation, and other factors. The acids produced may, for example, be those illustrated in Table 1, although their composition may vary. The dicarboxylic acid, being quite soluble in water, will be largely contained in the aqueous phase of the oxidation product. The metal salts will be largely dissolved into this phase.

The non-polar to slightly polar solvent used for dissolving the dicarboxylic acids may be such a solvent as has been discussed more particularly in the foregoing illustrations, as for example, dichlorobenzene or it may be an alcohol from which the esters are to be formed. Mixtures of alcohols with other non-polar to slightly polar solvents may be used. Such other solvent than alcohol may be used in the preliminary stages of the esterification. The alcohol may be added at any stage and such other non-polar solvent may be removed at any stage. It is advantageous to utilize a catalyst such as sulfuric acid or other well-known ester-forming catalysts during the esterification. The heated mixture may be flash-distilled or may be otherwise treated during the esterification, to remove water. If a lower-boiling alcohol is employed, flash-distillation may be found to be particularly advantageous. The volatilization of the solvent by flash-distillation or other distillation will be helpful in removing the water.

If a solvent other than the alcohol used for the esterification is employed, it is desirable to select a solvent with a boiling point different from the boiling point of any of the esters produced, in order to make the separation more easily.

On completion of the esterification, the metal salts will be present as a precipitate, which may be filtered or otherwise separated from the solution, but the separation is preferably effected by distilling the esters and leaving the metal salts suspended in the undistilled solvent or other residue.

Thus, if acids such as those mentioned in the last column of Table 1 are produced in the oxidation, the aqueous phase will contain a substantial amount of dicarboxylic acids from $C_4$ through $C_{10}$ and also monocarboxylic acids from $C_4$ through $C_{12}$, and, if nitric acid is used as the oxidation agent, as is herein more particularly contemplated, nitrocarboxylic acid is obtained and esterified.

If, for example, ethyl alcohol is used for the esterification, and no non-polar to slightly polar solvent is employed, the alcohol will tend to keep the metal salts in solution. It is, therefore, desirable to use a non-polar to slightly polar solvent, such as, a dichlorobenzene, etc. to effect the separation of the metal salts and filter these off by a pressure filter or the like before adding the alcohol and starting the esterification.

To illustrate, it is assumed that after precipitation and filtration of the metal salts, ethyl alcohol is added, together with sulfuric acid and the heating continued to esterify the carboxylic acids. The resulting esters may be distilled by flash-distillation or otherwise. If the esters are fractionally distilled from the esterified product, the unreacted alcohol will first distill over and then the monocarboxylic acid esters, which may be collected as a single fraction or may be separated into any desired number of fractions. The dicarboxylic acid esters will then distill over and may be fractionally collected to produce fractions containing, respectively, high contents of the different dicarboxylic acids. The nitrocarboxylic acid esters will remain in the still residue unless they are voltilized. They may be left in the residue and the residue used in any approved manner.

The advantage in the direct-esterification process is that most of the cost of finishing and purifying the dicarboxylic acids is eliminated, as, for instance, (a) the various separations of the acids, (b) the re-crystallizations, and (c) the cost of drying dicarboxylic acids prior to esterification. By the method outlined above, the anhydrous dicarboxylic acid mixture is primarily esterified with the appropriate alcohol, either the mixed esters recovered by distillation or the separate and individual esters are secured in a relatively pure condition. The cost of so handling the esters is an economic improvement over the usual method.

The examples of the various steps as contained herein are merely illustrative. The invention is not limited thereto. A metal salt impurity may be derived from any one or more sources. The whole of the oxidation product or any part thereof may be treated with a nonpolar or slightly polar solvent for the separation of the salt and the recovery of dicarboxylic acids. The invention is defined in the claims which follow.

What I claim is:

1. In the process of obtaining dicarboxylic acids substantially free from metal salts, starting with an aqueous oxidation product containing them produced by oxidizing source material from the class consisting of saturated and unsaturated cyclic and acyclic hydrocarbons and oxygen-containing derivatives which hydrocarbons and derivatives contain at least 4 carbon atoms in a saturated straight chain, the steps which comprise adding a nonpolar or slightly polar solvent to at least a part of the salt-containing dicarboxylic acids and water and heating, said salt being mostly sodium and iron salt, thereby dissolving the dicarboxylic acids into the solvent, and then substantially volatilizing all of the water and thereby precipitating metal salts from the solution, the boiling point of said solvent not exceeding substantially 220° C.

2. The process of preceding claim in which the dicarboxylic acids are contaminated with metal salts thereof and an inorganic acid is mixed with the solution thereof and at least some of said salts are thereby converted to dicarboxylic acids before removal of substantially all of the water.

3. In the process of obtaining dicarboxylic acids substantially free from iron salts, starting with an aqueous oxidation product containing them produced by oxidizing with nitric acid source material consisting of saturated and unsaturated cyclic and acyclic hydrocarbons and oxygen-containing derivatives which hydrocarbons and derivatives contain at least 4 carbon atoms in a saturated straight chain, the steps which comprise adding phosphoric acid and a nonpolar to slightly polar solvent to at least a part of the oxidation product which includes water and dicarboxylic acids contaminated with iron salts thereof, and heating, thereby (1) dissolving the dicarboxylic acids into the solvent, (2) converting at least some of said iron salts of dicarboxylic acid to dicarboxylic acids, and (3) volatilizing substantially all water from the resulting solution, and rendering the resulting iron phosphate insoluble in the solution, the boiling point of said solvent not exceeding substantially 220° C.

4. In the process of obtaining dicarboxylic acids substantially free from metal salts, starting with an aqueous oxidation product containing them produced by oxidizing a source material of the class consisting of saturated and unsaturated cyclic and acyclic hydrocarbons and oxygen-containing derivatives thereof which hydrocarbons and derivatives contain at least 4 carbon atoms in a saturated straight chain by an aqueous oxidizing agent, and obtaining an aqueous solution which contains metal salts, the steps which comprise crystallizing acids from the solution, and adding a non-polar or slightly polar solvent to the wet crystallized acids which contain metal salts and heating, said salts being mostly sodium and iron salts, thereby dissolving the acids into the solvent and rendering the solution substantially anhydrous by volatilization of the water whereby at least some of said metal salts are made insoluble and separate from the solution, the boiling point of said solvent not exceeding substantially 220 C.

5. In the process of obtaining dicarboxylic acids substantially free from metal salts, starting with an aqueous oxidation product containing them produced by oxidizing a source material of the class consisting of saturated and unsaturated cyclic and acyclic hydrocarbons and oxygen-containing derivatives thereof which hydrocarbons and derivatives contain at least 4 carbon atoms in a saturated straight chain by an aqueous oxidizing agent and obtaining an aqueous solution which contains metal salts, said salts being mostly sodium and iron salts, the steps which comprise crystallizing dicarboxylic acids from the solution, and adding a non-polar or slightly polar solvent to the mother liquor and heating, whereby (1) substantially all of the water is volatilized, (2) the dicarboxylic acids are dissolved into the solvent, and (3) at least some of said metal salts are rendered insoluble and separate from the solution, the boiling point of said solvent not exceeding substantially 220° C.

6. In the process of obtaining dicarboxylic acids substantially free from metal salts, starting with an aqueous oxidation product containing them produced by oxidizing source material from the class consisting of saturated and unsaturated cyclic and acyclic hydrocarbons and oxygen-containing derivatives thereof, which hydrocarbons and derivatives contain at least 4 carbon atoms in a saturated straight chain, using aqueous nitric acid in the oxidation, and producing dicarboxylic acids and metal salts, said salts being mostly sodium and iron salts, the steps which comprise adding a non-polar to slightly polar solvent to aqueous portion of the oxidation product and heating, thereby (1) volatilizing the nitric acid and substantially all of the water, (2) dissolving the dicarboxylic acids in the solvent, and (3) precipitating at least some of said metal salts, the boiling point of said solvent not exceeding substantially 220° C.

7. In the process of obtaining dicarboxylic acids substantially free from iron salts, starting with an aqueous oxidation product containing them produced by oxidizing source material from the class consisting of saturated and unsaturated cyclic and acyclic hydrocarbons and oxygen-containing derivatives which hydrocarbons and derivatives contain at least 4 carbon atoms in a saturated straight chain, whereby an aqueous solution of dicarboxylic acids and metal salts is obtained, the salts being mostly sodium and iron salts, the steps which comprise adding a non-polar or slightly polar solvent to at least a part of the salt-containing solution and heating, thereby dissolving the dicarboxylic acids into the solvent and volatilizing substantially all of the water and precipitating the metal salts, separating them from the solution, and, while the solution is still hot, adding alcohol and esterifying the dicarboxylic acids, the boiling point of said solvent not exceeding substantially 220° C.

8. In the process of obtaining dicarboxylic acids substantially free from metal salts, starting with an aqueous oxidation product containing them produced by oxidizing with an oxidizing agent containing nitric acid, source material from the class consisting of saturated and unsaturated cyclic and acyclic hydrocarbons and oxygen-containing derivatives, which hydrocarbons and derivatives contain at lest 4 carbon atoms in a saturated chain, with volatilization of nitric acid from the aqueous oxidation product, the steps which comprise crystallizing dicarboxylic acids from the resulting salt-containing aqueous solution of dicarboxylic acids, said salt being mostly iron and sodium salt, and adding a non-polar to slightly polar solvent to the mother liquor and heating, whereby (1) substantially all of the water is volatilized, (2) the dicarboxylic acids are dissolved into the solvent, and (3) at least some of said metal salts are rendered insoluble and separate from the solution, the boiling point of said solvent not exceeding substantially 220° C.

References Cited in the file of this patent

UNITED STATES PATENTS

| | | |
|---|---|---|
| 2,203,680 | Ellingboe | June 11, 1940 |
| 2,365,290 | Price et al. | Dec. 19, 1944 |
| 2,560,156 | Cavanaugh et al. | July 10, 1951 |
| 2,716,133 | Pooler | Aug. 23, 1955 |
| 2,742,495 | Nawiasky et al. | Apr. 17, 1956 |

UNITED STATES PATENT OFFICE
CERTIFICATION OF CORRECTION

Patent No. 2,971,023            February 7, 1961

Norman C. Hill

It is hereby certified that error appears in the above numbered patent requiring correction and that the said Letters Patent should read as corrected below.

Column 9, line 70, for "finds" read -- find --; column 12, line 8, for "substantially volatilizing" read -- volatilizing substantially --; line 12, after "of" insert -- the --; line 54, for "220" read -- 220° --; column 13, line 15, after "obtaining" insert -- esters of --; line 16, for "iron" read -- metal --; line 17, for "them" read -- dicarboxylic acids --; column 14, line 10, for "lest" read -- least --.

Signed and sealed this 20th day of June 1961.

(SEAL)
Attest:

ERNEST W. SWIDER
Attesting Officer

DAVID L. LADD
Commissioner of Patents